US012160722B2

(12) United States Patent
Liu et al.

(10) Patent No.: US 12,160,722 B2
(45) Date of Patent: Dec. 3, 2024

(54) SOUND GENERATING APPARATUS AND ELECTRONIC DEVICE

(71) Applicant: GOERTEK INC., Shandong (CN)

(72) Inventors: Chunfa Liu, Shandong (CN); Jianbin Yang, Shandong (CN); Jianxin Wang, Shandong (CN); Shousong Qiang, Shandong (CN)

(73) Assignee: GOERTEK INC., Weifang (CN)

( * ) Notice: Subject to any disclaimer, the term of this patent is extended or adjusted under 35 U.S.C. 154(b) by 200 days.

(21) Appl. No.: 17/999,877

(22) PCT Filed: Nov. 7, 2020

(86) PCT No.: PCT/CN2020/127320
§ 371 (c)(1),
(2) Date: Nov. 25, 2022

(87) PCT Pub. No.: WO2021/238071
PCT Pub. Date: Dec. 2, 2021

(65) Prior Publication Data

US 2023/0247367 A1 Aug. 3, 2023

(30) Foreign Application Priority Data

May 25, 2020 (CN) ......................... 202010458314.1

(51) Int. Cl.
*H04R 9/04* (2006.01)
*H04R 9/02* (2006.01)
*H04R 9/06* (2006.01)

(52) U.S. Cl.
CPC ............. *H04R 9/045* (2013.01); *H04R 9/025* (2013.01); *H04R 9/06* (2013.01)

(58) Field of Classification Search
CPC .......... H04R 9/045; H04R 9/025; H04R 9/06; H04R 1/06; H04R 9/043; H04R 9/041;
(Continued)

(56) References Cited

U.S. PATENT DOCUMENTS 3,956,599 A 5/1976 McIntosh
11,722,824 B2 * 8/2023 Guo ....................... H04R 7/127 381/398

(Continued)

FOREIGN PATENT DOCUMENTS

CN 202799116 U 3/2013
CN 205754840 U 11/2016

(Continued)

OTHER PUBLICATIONS

International Search Report from International Application No. PCT/CN2020/127320 mailed Feb. 24, 2021.

*Primary Examiner* — Angelica M McKinney
(74) *Attorney, Agent, or Firm* — Shih IP Law Group, PLLC

(57) ABSTRACT

A sound generating apparatus and an electronic device, comprising: a voice coil assembly; a pad disposed on a surface of the voice coil assembly and also provided with a separation structure, and the separation structure separates the pad into a first conductive part and a second conductive part, the first conductive part and the second conductive part are electrically connected, and the voice coil assembly is electrically connected with the first conductive part; and a conductive elastic member connected with the second conductive part, and the conductive elastic member is used for centering support the voice coil assembly. The technical solution of the present disclosure is intended to ensure that the welding end of the conductive structure and the welding end of the voice coil are consistent in height on the welding surface, so as to ensure the sound generating effect of the sound generating apparatus.

17 Claims, 5 Drawing Sheets

(58) Field of Classification Search
CPC ........ H04R 9/04; H04R 2400/11; H04R 9/02; H04R 1/02; H04R 7/127
See application file for complete search history.

(56) References Cited

U.S. PATENT DOCUMENTS

| | | | |
|---|---|---|---|
| 2010/0014703 | A1 | 1/2010 | Wang et al. |
| 2014/0169593 | A1 | 6/2014 | Kwon et al. |

FOREIGN PATENT DOCUMENTS

| | | | | | |
|---|---|---|---|---|---|
| CN | 107147976 | A | | 9/2017 | |
| CN | 208638626 | U | | 3/2019 | |
| CN | 109672948 | A | | 4/2019 | |
| CN | 208863072 | U | | 5/2019 | |
| CN | 209627682 | U | | 11/2019 | |
| CN | 110545509 | A | * | 12/2019 | ............... H04R 9/06 |
| CN | 110719554 | A | | 1/2020 | |
| CN | 210093509 | U | | 2/2020 | |
| JP | 2014202305 | A | | 10/2014 | |
| KR | 101222282 | B1 | | 1/2013 | |

* cited by examiner

SOUND GENERATING APPARATUS AND ELECTRONIC DEVICE

The present disclosure relates to the field of electroacoustic technology, particularly to a sound generating apparatus and an electronic device.

BACKGROUND TECHNOLOGY

Sound generating apparatus is an important acoustic component in electronic devices, which is a kind of transducer that converts electrical signals into sound signals. With the continuous progress and innovation of technology, the structural design of the traditional sound generating apparatus is also continuously advancing innovation and changes, therefore it is necessary to satisfy the development trend of becoming thinner, pay more attention to the optimization of performance, and realize both of the simplification of process and the cost control.

In a conventional sound generating apparatus, when the voice coil is supplied with power, the conductive structure is generally electrically connected to the voice coil, and then the conductive structure is connected to an external circuit. The welding end of the voice coil forms a welding layer after welding (welding is only an exemplary connection method, and other electrical connection methods may also be used). Since the welding layer has a certain height and the voice coil wire itself also has a certain height, the welding end of the conductive structure is difficult to locate on the voice coil. As a result, the height of the conductive structure and the height of the voice coil on the welding surface are inconsistent, which affects the sound generating effect of the sound generating apparatus.

SUMMARY

One of the objections of the present disclosure is to provide a sound generating apparatus, which may ensure that the height of the welding end of the conductive structure and the height of the welding end of the voice coil are consistent on the welding surface, so as to ensure the sound generating effect of the sound generating apparatus.

In order to achieve the above purpose, the present disclosure provides a sound generating apparatus including: a voice coil assembly; a pad disposed on a surface of the voice coil assembly and provided with a separation structure, wherein the separation structure separates the pad into a first conductive part and a second conductive part, the first conductive part and the second conductive part are electrically connected, and the voice coil assembly is electrically connected with the first conductive part; and a conductive elastic member connected with the second conductive part, and the conductive elastic member is used for centering support the voice coil assembly.

In some embodiments of the present disclosure, a material of the separation structure includes an insulating material.

In some embodiments of the present disclosure, a material of the separation structure includes paper, rubber or silicone.

In some embodiments of the present disclosure, the separation structure is a groove, and the first conductive part and the second conductive part are disposed on two opposite sides of the groove.

In some embodiments of the present disclosure, the separation structure is integrally formed with the pad, and the separation structure protrudes from a surface of the pad.

In some embodiments of the present disclosure, the first conductive part is fixed to the voice coil assembly by laser welding, and the second conductive part is fixed to the conductive elastic member by laser welding.

Alternatively, the first conductive part is fixed to the voice coil assembly by soldering, and the second conductive part is fixed to the conductive elastic member by soldering.

Alternatively, the first conductive part is fixed to the voice coil assembly by bonding, and the second conductive part is conductively fixed to the conductive elastic member by bonding.

In some embodiments of the present disclosure, the sound generating apparatus further includes an isolator, which is disposed on the surface of the voice coil assembly and is disposed adjacent to the first conductive part or the second conductive part.

In some embodiments of the present disclosure, the isolator includes at least two isolators, at least one of the isolators is disposed adjacent to the first conductive part, and at least another one of the isolators is disposed adjacent to the second conductive part.

In some embodiments of the present disclosure, an edge of the isolator is configured to overlap and connect with the first conductive part or the second conductive part.

In some embodiments of the present disclosure, the isolator includes at least two isolators, the edge of at least one of the isolators is configured to overlap and connect with the first conductive part, and the edge of at least another one of the isolators is configured to overlap and connect with the second conductive part.

In some embodiments of the present disclosure, the voice coil assembly includes a bobbin and a voice coil body, the voice coil body is wound on an outer surface of the bobbin, the pad is disposed on the outer surface of the voice coil body, the voice coil body is configured to receive an electrical signal, the voice coil body is provided with a wire lead, and the wire lead overlaps and connects with the first conductive part.

In some embodiments of the present disclosure, the sound generating apparatus includes a housing having an accommodating cavity therein, wherein the voice coil assembly is movably mounted in the accommodating cavity, and the conductive elastic member includes: a first connection part electrically connected with the second conductive part; a second connection part connected with the housing; and an elastic part electrically connects the first connection part and the second connection part, wherein the elastic part has a spiral shape, and a gap is formed between the elastic part and the voice coil assembly, wherein the sound generating apparatus further includes a buffer member, and the buffer member is disposed in the gap and contacts with the elastic part and the voice coil assembly.

In some embodiments of the present disclosure, a material of the buffer member includes flexible material.

In some embodiments of the present disclosure, the conductive elastic member is arranged in a bended strip structure.

In some embodiments of the present disclosure, the conductive elastic member is arranged in linear shape, strip shape or flat plate shape.

In some embodiments of the present disclosure, the pad includes at least two pads, the at least two pads are disposed on a surface of the voice coil body with intervals, each of the pads is provided with the separation structure, and each of the separation structures separates each of the pads into the first conductive part and the second conductive part, the conductive elastic member includes at least two conductive elastic members, and each of the conductive elastic members is electrically connected with the second conductive part of each pad.

Alternatively, the at least two pads are disposed on a surface of the bobbin.

Alternatively, one of the pads is disposed on a surface of the voice coil body, and another one of the pads is disposed on a surface of the bobbin.

The present disclosure further provides an electronic device including a sound generating apparatus. The sound generating apparatus includes: a voice coil assembly; a pad disposed on a surface of the voice coil assembly, wherein the pad is also provided with a separation structure, and the separation structure separates the pad into a first conductive part and a second conductive part, and the first conductive part and the second conductive part are electrically connected, and the voice coil assembly is electrically connected with the first conductive part; and a conductive elastic member connected with the second conductive part, and the conductive elastic member is used for centering support the voice coil assembly.

The sound generating apparatus of the present disclosure is provided with a voice coil assembly and a pad positioned on a surface of the voice coil assembly. The pad is provided with a separation structure which separates the pad into a first conductive part and a second conductive part, and the first conductive part and the second conductive part are electrically connected with each other after being separated. Since the pad is provided with the separation structure, the electrical connection operation at the first conductive part and the electrical connection operation at the second conductive part are performed isolated from each other when electrically connecting the electrical connection end of the voice coil assembly and the first conductive part, and electrically connecting the electrical connection end of the conductive elastic member and the second conductive part, and thus the electrical connection may not affect each other, which facilitates controlling the height of the electrical connection end of the voice coil assembly and the welding surface, and facilitate controlling the height of the electrical connection end of the conductive connector and the height of the welding surface. In the implementation circumstance of adopting welding for fixing, the flow of the solder layer on the pad may be prevented, and thereby facilitating the control of the solder layers of the first conductive part and the second conductive part, so that the electrical connection end of the conductive structure and the electrical connection end of the voice coil assembly are consistent in height on the welding surface, so as to ensure the sound generating effect of the sound generating apparatus. In this way, the technical solution of the present disclosure enables the welding end of the conductive structure and the welding end of the voice coil assembly are consistent in height on the welding surface, so as to ensure the sound generating effect of the sound generating apparatus.

BRIEF DESCRIPTION OF THE DRAWINGS

In order to more clearly illustrate the embodiments of the present disclosure or the technical solutions in the prior art, the following will briefly introduce the accompanying drawings required for the description of the embodiments or the prior art. It will be understood, the drawings in the following description are only part of the drawings of the present disclosure, and for those skilled in the art, other drawings may also be obtained according to the provided drawings without any creative effort.

REFERENCE SIGNS

Figure 1:
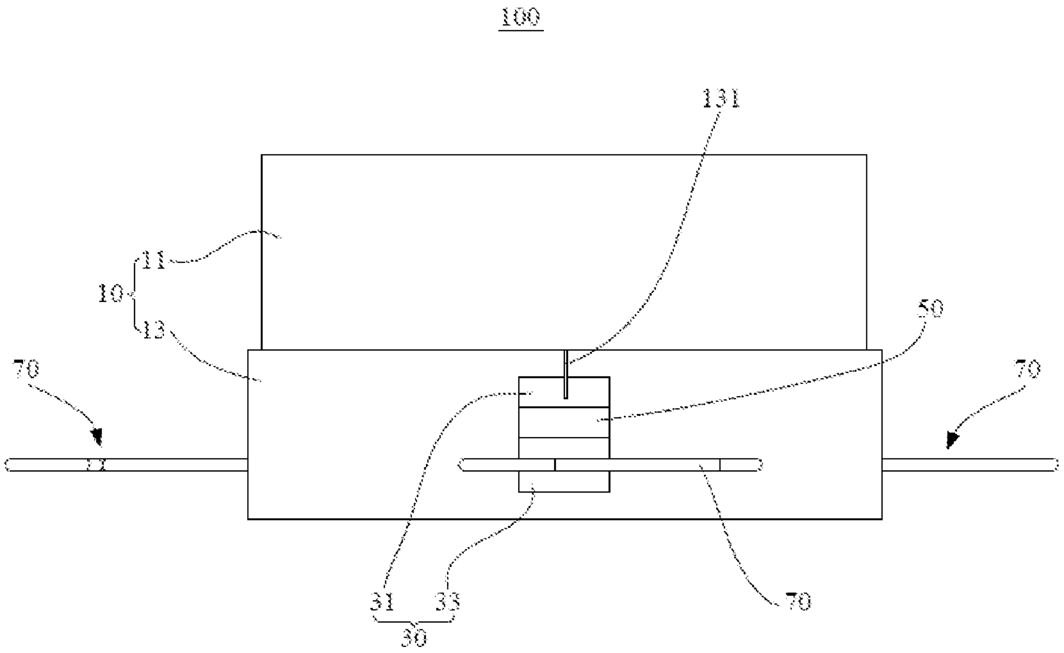
FIG. 1 is a structural schematic diagram illustrating the sound generating apparatus according to an embodiment of the present disclosure.

| Reference signs | Name | Reference signs | Name |
|---|---|---|---|
| 100 | sound generating apparatus | 50 | separation structure |
| 10 | voice coil assembly | 60 | gap |
| 11 | bobbin | 70 | conductive elastic member |
| 13 | voice coil body | 71 | first connection part |
| 131 | wire lead | 73 | second connection part |
| 30 | pad | 75 | elastic part |
| 31 | first conductive part | 80 | buffer member |
| 33 | second conductive part | 90 | isolator |

The solutions, features and advantages of the present disclosure will be further described with reference to the accompanying drawings through combination with the embodiments.

DETAILED DESCRIPTION OF THE EMBODIMENTS

The technical solutions in the embodiments of the present disclosure will be clearly and completely described below with reference to the drawings in the embodiments of the present disclosure. It would be understood, the described embodiments are only part of the embodiments of the present disclosure, rather than all the embodiments. Based on the embodiments in the present disclosure, all other embodiments obtained by persons of ordinary skill in the art without creative efforts fall within the protection scope of the present disclosure.

It should be noted that all directional indications (such as up, down, left, right, front, back, etc.) in the embodiments of the present disclosure are only used to explain the relative position relationship, motion, etc. between components in a specific view position (as shown in the drawings), and if the specific view position changes, the directional indication will change accordingly.

In addition, descriptions such as “first”, “second”, etc. in the present disclosure are only for descriptive purposes, and should not be construed as indicating or implying their relative importance or implicitly indicating the number of indicated technical features. Thus, features defined with “first” and “second” may explicitly or implicitly include at least one such feature. In addition, the technical solutions of various embodiments of the present disclosure may be combined with each other, but the combination must be based on the realization by those of ordinary skill in the art.

When the combination of technical solutions is contradictory or impossible, it should be considered that the combination of such technical solutions does not exist, nor is it within the scope of protection claimed by the present disclosure.

In the present disclosure, unless otherwise expressly specified and limited, the terms “connected”, “fixed”, etc. should be understood in a broad sense. For example, “fixed” may refer to a fixed connection, a detachable connection, or may be integrated; may refer to a mechanical connection or an electrical connection; may be directly connected or indirectly connected through an intermediate medium; and it may be an internal communication between two elements or an interaction relationship between two elements, unless otherwise specified. For those of ordinary skill in the art, the specific meanings of the above terms in the present disclosure can be understood differently according to specific situations.

Referring to FIGS. 1 to 5, the present disclosure provides a sound generating apparatus 100. The sound generating apparatus 100 comprises: a voice coil assembly 10; a pad 30 disposed on a surface of the voice coil assembly 10 and is also provided with a separation structure 50, and the separation structure 50 divides the pad 30 into a first conductive part 31 and a second conductive part 33, and the first conductive part 31 and the second conductive part 33 are electrically connected, and the voice coil assembly 10 is electrically connected with the first conductive part 31; and a conductive elastic member 70 connected with the second conductive part 33, and the conductive elastic member 70 is used for centering support the voice coil assembly 10.

In an embodiment, the sound generating apparatus 100 comprises: a vibration assembly, a magnetic circuit assembly, and a housing for mounting and fixing the vibration assembly and the magnetic circuit assembly, wherein the vibration assembly comprises a diaphragm and a voice coil assembly 10 below and coupled to the diaphragm. The magnetic circuit assembly comprises an upper magnetic guide plate, a magnet and a lower magnetic guide plate, wherein the upper magnetic guide plate and the lower magnetic guide plate are magnetic conductive structures and are used for conducting the magnetic lines of force generated by the magnet. The magnetic circuit assembly is formed with a magnetic gap 60, and the voice coil assembly 10 is disposed in the magnetic gap 60 of the magnetic circuit system. The lower magnetic guide plate of the present disclosure is a U-shaped structure and comprises a bottom wall and side walls. A magnetic gap 60 is formed between side surfaces of the upper magnetic guide plate, a magnet and the lower magnetic guide plate, and a relatively uniform magnetic field is formed in the magnetic gap 60, and the voice coil assembly 10 is disposed in the magnetic gap 60 having a relatively uniform magnetic field. Generally, the voice coil assembly 10 is formed by winding metal wires. When the voice coil assembly 10 is supplied with an electrical signal, the voice coil assembly 10 vibrates up and down under the action of the ampere force in the magnetic field. The vibration direction of the voice coil assembly is referred to as vertical direction or up-down direction, and the direction perpendicular to the vibration of the voice coil assembly 10 is referred to as horizontal direction. Since the diaphragm 91 and the voice coil assembly 10 are fixed and integrated by bonding or other means, the voice coil assembly 10 may also drive the diaphragm to vibrate when it vibrates up and down according to the electrical signal, thereby generating sound waves.

However, since the magnetic field in the magnetic gap 60 is only relatively uniform but not absolutely uniform, the position of the voice coil assembly 10 may change during the vibration of the voice coil assembly 10, and the magnetic lines of force on an upper side of the magnetic gap 60 are arc-shaped lines, thus the ampere force applied on the voice coil assembly 10 is not only in the vertical direction but also the ampere force in other directions, which causes the voice coil assembly 10 prone to deviation in non-vertical direction (i.e., different from the vibration direction) during vibration to further affect the vibration of the diaphragm.

In order to prevent the above-mentioned deviation, the conductive elastic member 70 is provided for centering the deviation of the voice coil assembly 10, i.e., ensuring that the voice coil assembly 10 vibrates along one vibration direction within the magnetic gap 60.

In some embodiments of the invention, the pad 30 is a copper foil, the copper foil has low surface oxygen characteristic so that it may be attached to various substrates, such as metal substrates, insulating material substrates, etc., the copper foil may be applied in a wide temperature range, may be well fixed at the desired position, and facilitate connecting the voice coil assembly 10 and the conductive elastic member 70.

In an embodiment, the outer profile of the pad 30 may have a polygon shape, or may have a circle shape or an ellipse shape, as long as it is convenient to provide the separation structure 50 and to connect the voice coil assembly 10 with the conductive elastic member 70.

The sound generating apparatus 100 of the present disclosure is provided with a voice coil assembly 10 and a pad 30 positioned on a surface of the voice coil assembly 10. The pad 30 is provided with a separation structure 50 which separates the pad 30 into a first conductive part 31 and a second conductive part 33, and the first conductive part 31 and the second conductive part 33 are electrically connected with each other after being separated. Since the pad 30 is provided with the separation structure 50, the electrical connection operation at the first conductive part 31 and the electrical connection operation at the second conductive part 33 are performed isolated from each other when electrically connecting the electrical connection end of the voice coil assembly 10 and the first conductive part 31, and electrically connecting the electrical connection end of the conductive elastic member 70 and the second conductive part 33, and thus the electrical connection may not affect each other, which may facilitate controlling the height of the electrical connection end of the voice coil assembly 10 and the welding surface, and facilitate controlling the height of the electrical connection end of the conductive connector and the height of the welding surface. In the implementation circumstance of adopting welding for fixing, the flow of the solder layer on the pad 30 may be prevented, and thereby facilitating the control of the solder layers of the first conductive part 31 and the second conductive part 33, so that the electrical connection end of the conductive structure and the electrical connection end of the voice coil assembly 10 are consistent in height on the welding surface, so as to ensure the sound generating effect of the sound generating apparatus. In this way, the technical solution of the present disclosure enables the welding end of the conductive structure and the welding end of the voice coil assembly 10 are consistent in height on the welding surface, so as to ensure the sound generating effect of the sound generating apparatus 100.

In some embodiments of the invention, the material of the separation structure 50 includes an insulating material. It can be understood that providing the insulating material means that the separation structure 50 and the pad 30 are provided separately, such arrangement may reduce the production cost, and since the welding characteristic of the insulating material is generally poor, such arrangement makes it difficult for the solder layer to attach to the separation structure 50 and furthermore move over the region separated by the separation structure 50 (since it is easy to detach from the welding position during welding if it is not easy to attach, other conductive parts may not be affected) in the case of adopting welding for fixing.

In some embodiments of the invention, the material of the separation structure 50 includes paper, rubber or silicone. In the present embodiment, the paper may be selected as Kraft paper, and the Kraft paper has high strength and light texture, and the light texture may avoid increasing the burden of voice coil assembly 10 and may reduce the loss of vibration energy of voice coil assembly 10. The Kraft paper may be fixed on the pad 30 by bonding and fixing. When the fixing is performed by welding, the solder layer is not easy to attach to the Kraft paper, so that the welding end of the conductive structure and the welding end of the voice coil assembly 10 may not affect each other during welding, so as to ensure that the welding end of the conductive structure and the welding end of the voice coil assembly are consistent in height on the welding surface. Rubber and silicone also have certain strength and light texture, and the light texture may avoid increasing the burden of voice coil assembly 10 and reduce the loss of vibration energy of voice coil assembly 10. The rubber or silicone may be fixed on the pad 30 by coating and fixing. When the fixing is performed by welding, the solder layer is not easy to attach to the rubber or silicone, so that the welding end of the conductive structure and the welding end of the voice coil assembly 10 may not affect each other during welding, so as to ensure that the welding end of the conductive structure and the welding end of the voice coil assembly 10 are consistent in height on the welding surface.

In some embodiments of the present disclosure, the separation structure 50 is a groove, and the first conductive part 31 and the second conductive part 33 are disposed on opposite sides of the groove. By providing the groove, when the fixing is performed by welding, the redundant solder is accommodated in the groove to prevent the redundant solder from interfering the electrical connection operation of another part of the pad 30, so that the welding end of the conductive structure and the welding end of the voice coil assembly 10 may not affect each other during welding, so as to ensure that the welding end of the conductive structure and the welding end of the voice coil assembly 10 are consistent in the height on the welding surface. It can be understood that, in order to facilitate the groove to have enough accommodating space to accommodate redundant solder, the depth, the width and the length of the groove may be provided larger to increase the volume of the accommodating space. Moreover, since the quality of the voice coil assembly 10 will not be increased by providing the groove, the vibration quality of the voice coil assembly 10 may be ensured to the maximum extent. On the premise of ensuring that the welding end of the conductive structure and the welding end of the voice coil assembly 10 are consistent in the height on the welding surface, the sound generating effect of the sound generating apparatus 100 may be better guaranteed.

In some embodiments of the present disclosure, the separation structure 50 is integrally formed with the pad 30, and the separation structure 50 protrudes on the surface of the pad 30. When the fixing is performed by soldering, the separation structure 50 disposed to be integrally formed may well separate the first conductive part 31 and the second conductive part 33, so that the welding end of the conductive structure and the welding end of the voice coil assembly 10 will not affect each other during welding, so as to ensure that the welding end of the conductive structure and the welding end of the voice coil assembly 10 are consistent in the height on the welding surface.

In some embodiments of the invention, the separation structure 50 is a mesh structure, and the mesh structure has certain blocking property and accommodating property, which may block the movement of solder, and may also accommodate a certain amount of solder when the amount of the solder is large. On the other hand, the quality of the mesh structure is lighter than that of the solid structure having the same size, and the lighter texture may avoid increasing the burden on the voice coil assembly 10, so as to reduce the loss of vibration energy of voice coil assembly 10. Providing the mesh structure may not greatly enhance the weight of the voice coil assembly 10, and may ensure the vibration quality of the voice coil assembly 10 to a better extent. On the premise of ensuring that the welding end of the conductive structure and the welding end of the voice coil assembly 10 are consistent in height on the welding surface, the sound generating effect of the sound generating apparatus 100 may be better guaranteed.

In some embodiments of the present disclosure, the first conductive part 31 and the voice coil assembly 10 are fixed by laser welding, and the second conductive part 33 and the conductive elastic part 70 are fixed by laser welding. The method of fixing by the laser welding has high welding efficiency and reduces the accumulation of solder, and thereby may ensure that the welding end of the conductive structure and the welding end of the voice coil assembly 10 are consistent in the height on the welding surface to a certain extent.

Alternatively, the first conductive part 31 and the voice coil assembly 10 are fixed by soldering, and the second conductive part 33 and the conductive elastic member 70 are fixed by soldering. The method of fixing by soldering has low production cost and may ensure a good yield, and thereby may ensure that the welding end of the conductive structure and the welding end of the voice coil assembly 10 are consistent in the height on the welding surface to a certain extent.

Alternatively, the first conductive part 31 and the voice coil assembly 10 are fixed by bonding, and the second conductive part 33 and the conductive elastic member 70 are fixed by electrically bonding. Specifically, conductive glue may be used to bond the first conductive part 31 with the voice coil assembly 10, and bond the second conductive part 33 with the conductive elastic member 70. Alternatively, the conductive solid glue may be used to bond the first conductive part 31 with the voice coil assembly 10, and bond the second conductive part 33 with the conductive elastic member 70, both of which may ensure a good bonding effect and generate less residue, and thereby may ensure that the welding end of the conductive structure and the welding end of the voice coil assembly 10 are consistent in the height on the welding surface to a certain extent.

Figure 3:
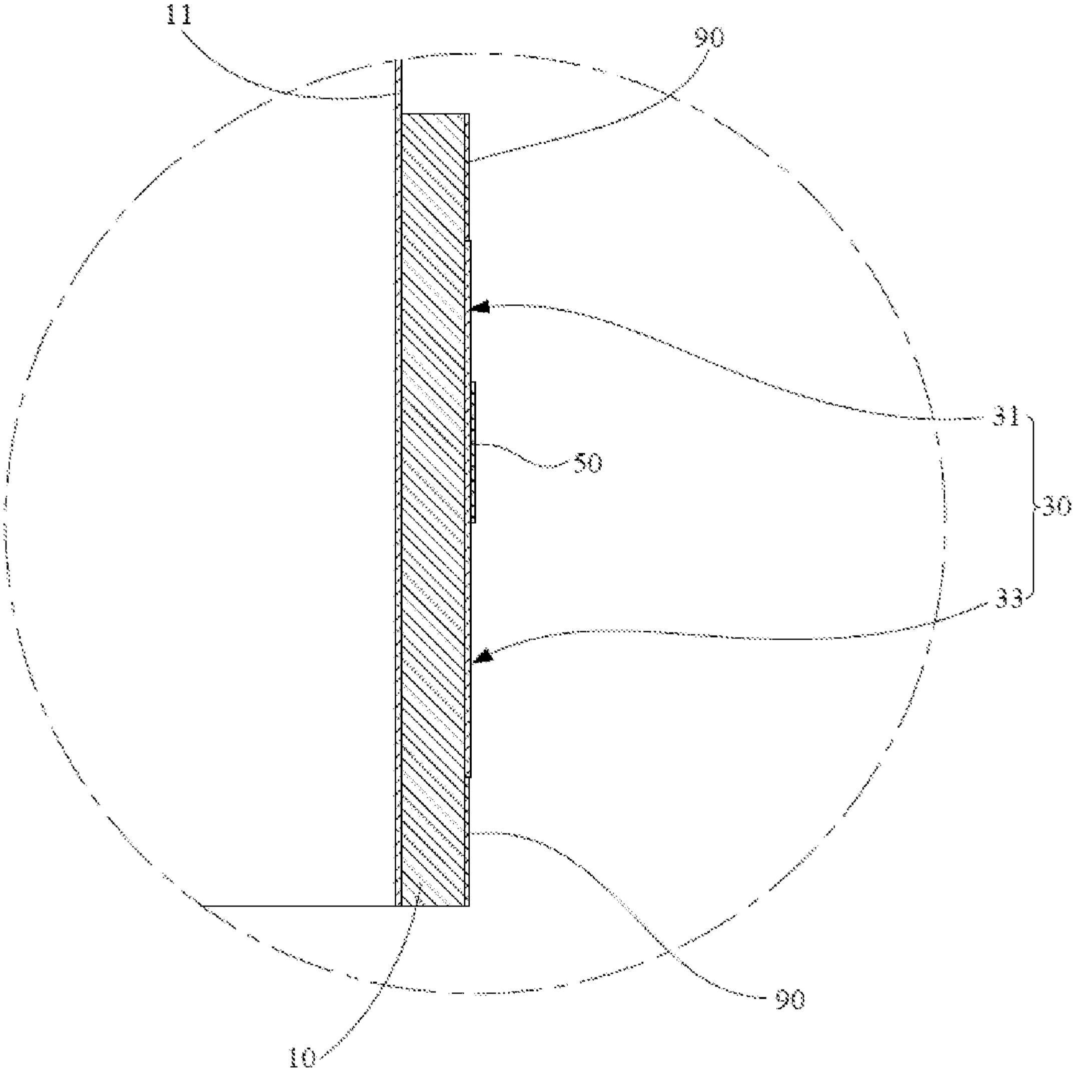
FIG. 3 is a cross-sectional diagram illustrating the pad of the sound generating apparatus according to an embodiment the present disclosure.
Figure 4:
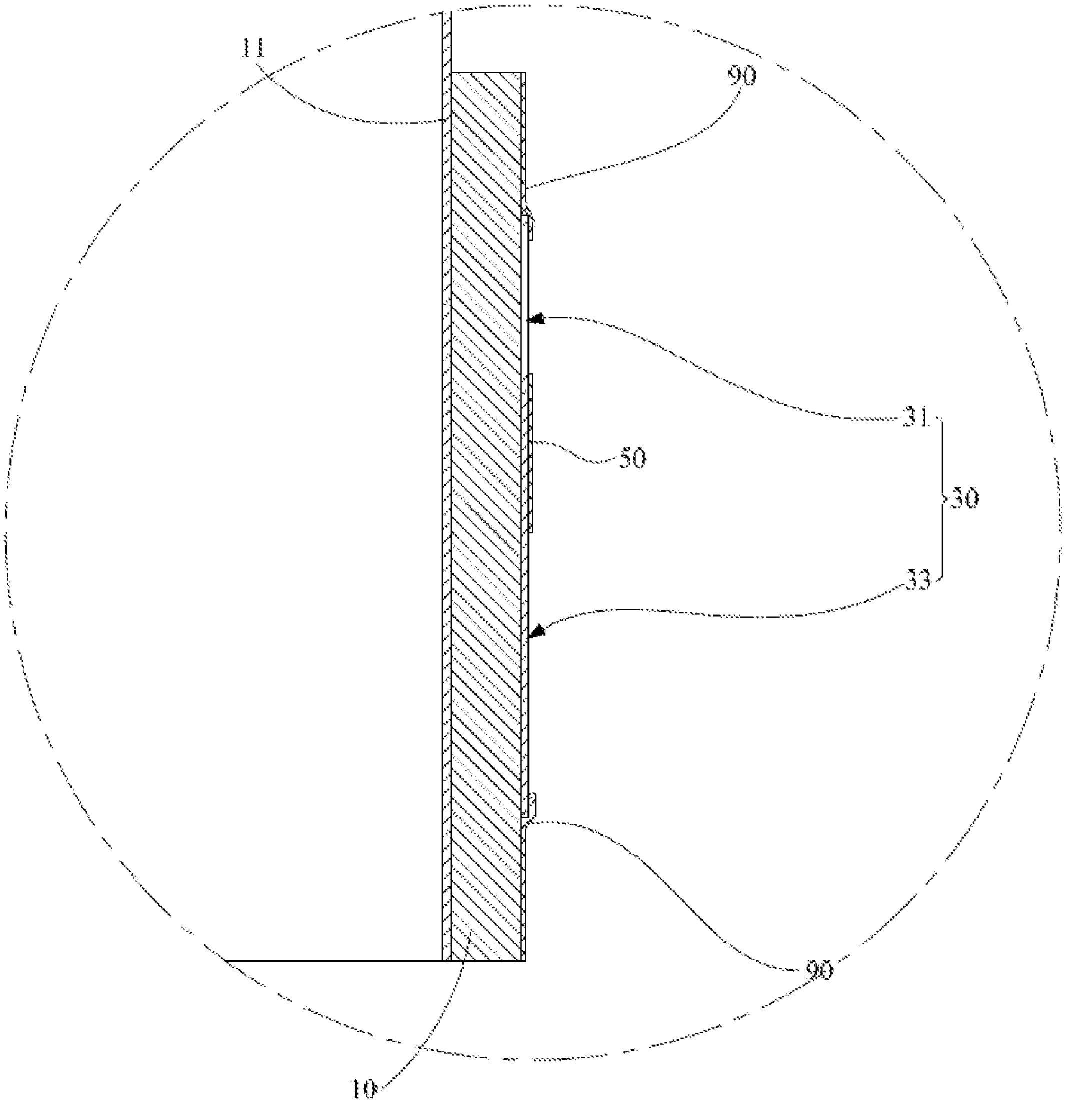
FIG. 4 is a cross-sectional diagram illustrating the pad of the sound generating apparatus according to another embodiment the present disclosure.

Referring to FIGS. 3 and 4, in some embodiments of the present invention, the sound generating apparatus 100 also comprises an isolator 90, which is disposed on the surface of the voice coil assembly 10 and is disposed adjacent to the first conductive part 31 or the second conductive part 33. Providing the isolator 90 may prevent the redundant solder, glue or electrical connection residue from adhering to the voice coil assembly 10 from the pad 30, and ensure the stability of the voice coil assembly 10 in operation. The isolator 90 may be butted against the edge of the pad 30, so as to maximize the isolation of the voice coil assembly 10 from the redundant solder, glue or electrical connection residue. The material of the isolator 90 may be paper, rubber, silicone, etc., as long as it has excellent isolate property. Certainly, an annular isolator 90 may also be used to enclose both of the first conductive part 31 and the second conductive part 33, and to isolate the redundant solder, glue or electrical connection residue at a plurality of positions to improve the isolation effect, and further ensure the stability of the voice coil assembly 10 in operation.

In some embodiments of the present disclosure, the isolator 90 comprises at least two isolators 90, at least one of the isolators 90 is disposed adjacent to the first conductive part 31, and at least another one of the isolation pieces 90 is disposed adjacent to the second conductive part 33. Providing a plurality of isolators 90 may isolate the redundant solder, glue or electrical connection residue at a plurality of positions, improve the isolation effect, and further ensure the stability of the voice coil assembly 10 in operation, without excessively increasing the quality of the voice coil assembly 10.

In some embodiments of the invention, an edge of the isolator 90 is configured to overlap and connect with the first conductive part 31 or the second conductive part 33. Such an arrangement may prevent redundant solder, glue or electrical connection residue from adhering to the voice coil assembly 10 from the pad 30, and ensure the stability of the voice coil assembly 10 in operation, on the other hand, such an arrangement may fix pad 30 by isolator 90 to improve the fixing effect of the pad 30. Certainly, an annular isolator 90 may also be used to enclose and overlap and connect both of the first conductive part 31 and the second conductive part 33, isolate the redundant solder, glue or electrical connection residue at a plurality of positions to improve the isolation effect. In addition, fixing the pad 30 at a plurality of positions may improve the effect of fixing the pad 30, and thus further ensure the stability of the voice coil assembly 10 in operation.

In some embodiments of the present disclosure, the isolator 90 comprises at least two isolators 90, an edge of at least one isolator 90 is configured to overlap and connect with the first conductive part 31, and the edge of the at least one isolator 90 is configured to overlap and connect with the second conductive part 33. Such an arrangement may isolate the redundant solder, glue or electrical connection residue at a plurality of positions, improve the isolation effect, and fix the pad 30 at a plurality of positions to improve the effect of fixing the pad 30, without excessively increasing the quality of the voice coil assembly 10.

Referring to FIGS. 1 to 4, in some embodiments of the present disclosure, the voice coil assembly 10 comprises a bobbin 11 and a voice coil body 13, and the voice coil body 13 is wound on the outer surface of the bobbin 11, the pad 30 is disposed on the outer surface the voice coil body 13, the voice coil body 13 is configured to receive an electrical signal, the voice coil body 13 is provided with a wire lead 131, and the wire lead 131 overlaps and connects with the first conductive part 31. The wire lead 131 may be enamelled wire or bare wire. In the case of adopting bonding for fixing, certain metal may be exposed on the surface of the enamelled wire, and the exposed metal is bonded to the first conductive part 31. In the case of adopting welding for fixing, bare wires may be used, which is easy to be fixed. Providing the bobbin 11 may facilitate the fixing of the voice coil body 13 and ensure the stability of the voice coil assembly 10 in operation.

Figure 2:
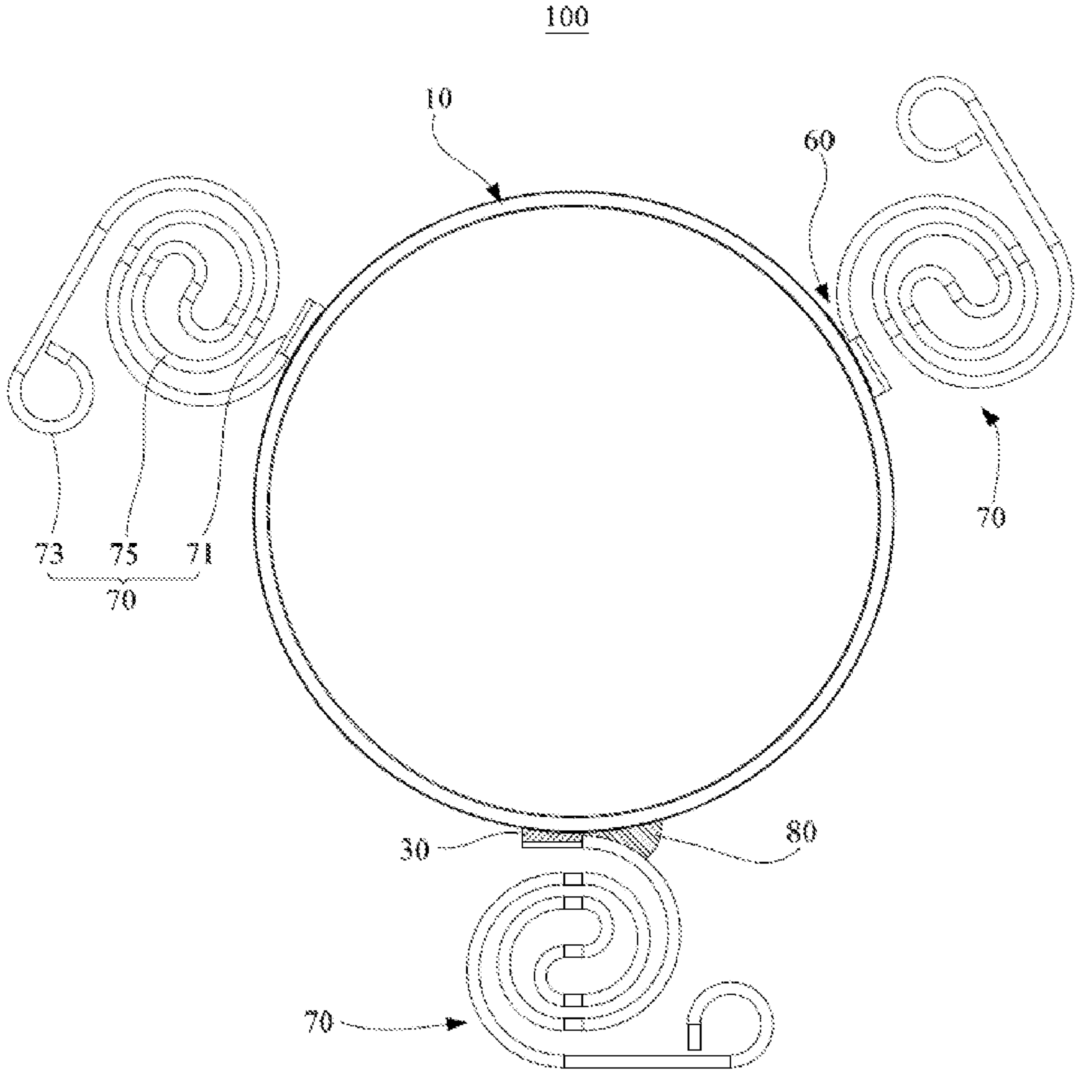
FIG. 2 is a top diagram illustrating the sound generating apparatus according to an embodiment of the present disclosure.
Figure 5:
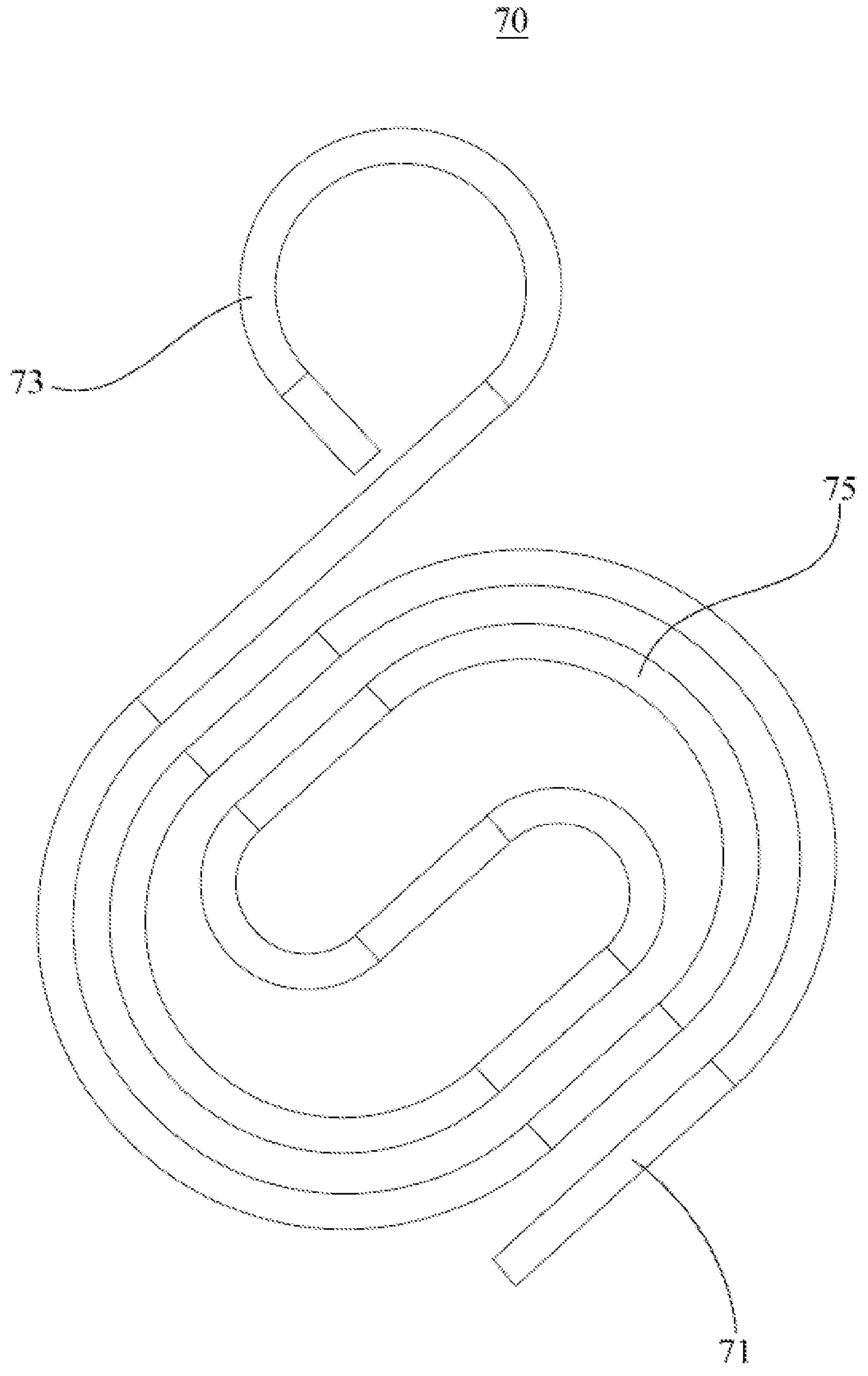
FIG. 5 is a cross-sectional diagram illustrating the conductive elastic member according to an embodiment the sound generating apparatus of the present disclosure.

Referring to FIGS. 2 and 5, in some embodiments of the present disclosure, the housing has an accommodating cavity therein, and the voice coil assembly 10 is movably mounted in the accommodating cavity, and the conductive elastic member 70 comprises: a first connection part 71 electrically connected with the second conductive part 33; a second connection part 73 connected with the housing; and an elastic part 75 electrically connects the first connection part 71 and the second connection part 73, wherein the elastic part 75 has a spiral shape, and a gap 60 is formed between the elastic part 75 and the voice coil assembly 10.

In an embodiment, the sound generating apparatus 100 may further comprise a buffer member 80 which is disposed in the gap 60 and contacts with the elastic part 75 and the voice coil assembly 10.

The conductive elastic member 70 is electrically connected and coupled with the second conductive part 33 through the first connection part 71 thereof, and transmits external electrical signals through the conductivity on the conductive elastic part 70. In addition, the conductive elastic member 70 also restricts the reciprocating vibration of the voice coil assembly 10 according to the vibration deviation state of the voice coil assembly 10 through the elastic deformation of the elastic part 75, so that the voice coil assembly 10 is stably positioned in the preset central region, to prevent the polarization of the voice coil assembly 10 and allows the reciprocating vibration of the voice coil assembly 10 more stable. Therefore, the conductive elastic member 70 has the functions of both electric conduction and centering, i.e., simultaneously realize the electric conduction function of the internal circuit and external circuit and the centering function on the vibration of the voice coil assembly 10, which may not only save space inside the cavity of the sound generating apparatus 100, but also effectively simplify the assembly process of the sound generating apparatus 100. The spiral-shaped elastic part 75 has a large elastic deformation amount, so that the centering the vibration of the voice coil assembly 10 may be better performed. Also, since the first connection part 71 and the second conductive part 33 are rigidly connected, providing the buffer member 80 may allow the connection between the first connection part 71 and the second conductive part 33 to be buffered by the buffer member 80 when the conductive elastic member 70 is pulled to perform the centering of the voice coil assembly 10, so as to ensure the effect of the connection between the first connection part 71 and the second conductive part 33.

In some embodiments of the present disclosure, the material of the buffer member 80 includes a flexible material, and may be glue coating, silicone, rubber, etc., which may deform under very small external force and recover to the original state after removing the external force, so that a good buffering effect may be achieved.

In some embodiments of the present disclosure, the conductive elastic member 70 is arranged in a bended strip structure. The narrow and long structure has a large elastic deformation amount, so that the centering the vibration of the voice coil assembly 10 may be better performed.

In some embodiments of the invention, the conductive elastic member 70 is arranged in linear shape, strip shape or flat plate shape. The linear shape, strip shape or flat shape have a large elastic deformation amount, so that the centering the vibration of the voice coil assembly 10 may be better performed.

In some embodiments of the present disclosure, the pads 30 comprises at least two pads 30, and the at least two pads 30 are disposed on a surface of the voice coil body 13 with intervals, each of the pads 30 is provided with the separation structure 50, and each of the separation structures 50 separates the pad 30 into a first conductive part and a second conductive part 33.

In an embodiment, the conductive elastic members 70 have at least two conductive elastic members, and each of the conductive elastic members 70 is electrically connected with the second conductive part 33 of the pad 30.

Alternatively, the at least two pads 30 are disposed on a surface of the bobbin 11.

Alternatively, one of the pads 30 is disposed on a surface of the voice coil body 13, and another one of the pads 30 is disposed on a surface of the bobbin 11.

Since the voice coil 10 generally outputs unidirectional current, the providing of two pads 30 may be better to guide the input and output of the current, so as to ensure the vibration stability of voice coil assembly 10. The pad 30 may be position on the bobbin 11 and/or the voice coil body 13, as long as it is convenient for the connection of the conductive elastic member 70. Furthermore, the voice coil body 13 may be designed to be round shape (for example, when used in the circular sound generating apparatus 100) or square shape, runway shape, oval shape and other shapes as required.

It can be understood that the sound generating apparatus 100 may be a rectangular sound generating apparatus 100 or a circular sound generating apparatus 100. When the sound generating apparatus 100 is arranged in a rectangular, the center magnetic steel is also arranged to be a strip shape with a rectangular shape appearance, accordingly, the sound generating apparatus 100 is also rectangular shape appearance. Compared with a circle shape, such a structure has a higher space utilization rate when it applied to the electronic device. In the meanwhile, under the premise of the same area, the diaphragm in stripe shape is easier to obtain greater amplitude. The sound generating apparatus 100 provided by the present disclosure may also form a thin structure in the upper and lower directions on the whole. In this way, it is easier to be applied to the flat mounting space.

The invention also provides an electronic device, comprising a sound generating apparatus 100, which comprises: a voice coil assembly 10; a pad 30 disposed on a surface of the voice coil assembly 10, and the pad 30 is also provided with a separation structure 50, the separation structure 50 divides the pad 30 into a first conductive part 31 and a second conductive part 33, the first conductive part 31 and the second conductive part 33 are electrically connected, and the voice coil assembly 10 is electrically connected with the first conductive part 31; and a conductive elastic member 70 connected with the second conductive part 33, the conductive elastic member 70 is used for centering support the voice coil assembly 10. Since the electronic device applies all the technical solutions of all the above embodiments, it at least has all the beneficial effects obtained by the technical solutions of the above embodiments, which will not be repeated herein.

The above only describes the preferred embodiments of the present disclosure, and is not intended to limit the scope of the present disclosure. Any equivalent structural transformation made by using the contents of the description and drawings of the present disclosure within the inventive concept of the present disclosure, or direct/indirect application in other relevant technical fields, is included in the scope of patent protection of the present disclosure.

What is claimed is:

1. A sound generating apparatus, comprising:

a voice coil assembly;

a pad disposed on a surface of the voice coil assembly and provided with a separation structure, wherein the separation structure separates the pad into a first conductive part and a second conductive part, the first conductive part and the second conductive part are electrically connected, and the voice coil assembly is electrically connected with the first conductive part; and a conductive elastic member connected with the second conductive part, and the conductive elastic member is used for centering support the voice coil assembly.

2. The sound generating apparatus of claim 1, wherein a material of the separation structure comprises an insulating material.

3. The sound generating apparatus of claim 2, wherein a material of the separation structure comprises paper, rubber or silicone.

4. The sound generating apparatus of claim 1, wherein the separation structure is a groove, and the first conductive part and the second conductive part are disposed on two opposite sides of the groove.

5. The sound generating apparatus of claim 1, wherein the separation structure is integrally formed with the pad, and the separation structure protrudes from a surface of the pad.

6. The sound generating apparatus of claim 1, wherein the first conductive part is fixed to the voice coil assembly by laser welding, and the second conductive part is fixed to the conductive elastic member by laser welding, or wherein the first conductive part is fixed to the voice coil assembly by soldering, and the second conductive part is fixed to the conductive elastic member by soldering, or wherein the first conductive part is fixed to the voice coil assembly by bonding, and the second conductive part is conductively fixed to the conductive elastic member by bonding.

7. The sound generating apparatus of claim 1, wherein the sound generating apparatus further comprises an isolator, which is disposed on the surface of the voice coil assembly and is disposed adjacent to the first conductive part or the second conductive part.

8. The sound generating apparatus of claim 7, wherein the isolator comprises at least two isolators, at least one of the isolators is disposed adjacent to the first conductive part, and at least another one of the isolators is disposed adjacent to the second conductive part.

9. The sound generating apparatus of claim 7, wherein an edge of the isolator is configured to overlap and connect with the first conductive part or the second conductive part.

10. The sound generating apparatus of claim 9, wherein the isolator comprises at least two isolators, the edge of at least one of the isolators is configured to overlap and connect with the first conductive part, and the edge of at least another one of the isolators is configured to overlap and connect with the second conductive part.

11. The sound generating apparatus of claim 1, wherein the voice coil assembly comprises a bobbin and a voice coil body, the voice coil body is wound on an outer surface of the bobbin, the pad is disposed on the outer surface of the voice coil body, the voice coil body is configured to receive an electrical signal, the voice coil body is provided with a wire lead, and the wire lead overlaps and connects with the first conductive part.

12. The sound generating apparatus of claim 11, wherein the pad comprises at least two pads, the at least two pads are disposed on a surface of the voice coil body with intervals, each of the pads is provided with the separation structure, and each of the separation structures separates each of the pads into the first conductive part and the second conductive part, wherein the conductive elastic member comprises at least two conductive elastic members, and each of the conductive elastic members is electrically connected with the second conductive part of each pad, or wherein the at least two pads are disposed on a surface of the bobbin, or wherein one of the pads is disposed on a surface of the voice coil body, and another one of the pads is disposed on a surface of the bobbin.

13. The sound generating apparatus of claim 1, wherein the sound generating apparatus comprises a housing having an accommodating cavity therein, wherein the voice coil assembly is movably mounted in the accommodating cavity, and the conductive elastic member comprises:

a first connection part electrically connected with the second conductive part;

a second connection part connected with the housing; and an elastic part electrically connects the first connection part and the second connection part, wherein the elastic part has a spiral shape, and a gap is formed between the elastic part and the voice coil assembly, wherein the sound generating apparatus further comprises a buffer member, and the buffer member is disposed in the gap and contacts with the elastic part and the voice coil assembly.

14. The sound generating apparatus of claim 13, wherein a material of the buffer member comprises flexible material.

15. The sound generating apparatus of claim 1, wherein the conductive elastic member is arranged in a bended strip structure.

16. The sound generating apparatus of claim 15, wherein the conductive elastic member is arranged in linear shape, strip shape or flat plate shape.

17. An electronic device, comprising a sound generating apparatus of claim 1.

* * * * *